US009381782B2

(12) United States Patent
Schwennsen

(10) Patent No.: US 9,381,782 B2
(45) Date of Patent: Jul. 5, 2016

(54) TILT ADJUSTMENT OF BALL MOUNT HEAD

(71) Applicant: CURT Manufacturing, LLC, Eau Claire, WI (US)

(72) Inventor: Kristopher William Schwennsen, Mondovi, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 14/511,402

(22) Filed: Oct. 10, 2014

(65) Prior Publication Data

US 2015/0102581 A1   Apr. 16, 2015

Related U.S. Application Data

(60) Provisional application No. 61/889,407, filed on Oct. 10, 2013.

(51) Int. Cl.
*B60D 1/24* (2006.01)
*B60D 1/50* (2006.01)
*B60D 1/06* (2006.01)

(52) U.S. Cl.
CPC ............... *B60D 1/247* (2013.01); *B60D 1/065* (2013.01); *B60D 1/50* (2013.01)

(58) Field of Classification Search
CPC ........... B60D 1/247; B60D 1/065; B60D 1/50
USPC ............. 280/406.2, 406.1, 405.1, 407, 455.1, 280/456.1, 457, 460.1, 475, 491.1, 491.4, 280/504, 507, 511, 514
See application file for complete search history.

(56) References Cited

U.S. PATENT DOCUMENTS

| | | | | |
|---|---|---|---|---|
| 3,061,333 A * | 10/1962 | Sudeikis | ................. | B60D 1/56 280/490.1 |
| 4,033,601 A * | 7/1977 | Lindahl | .................... | B60D 1/46 280/490.1 |
| 4,211,427 A | 7/1980 | Young et al. | | |
| 5,465,991 A * | 11/1995 | Kass | ........................ | B60D 1/06 280/406.2 |
| 5,562,298 A * | 10/1996 | Kass | ........................ | B60D 1/06 280/406.1 |
| 5,799,965 A * | 9/1998 | Kass | ...................... | B60D 1/247 280/406.1 |
| 5,934,698 A * | 8/1999 | Despain | ................... | B60D 1/46 280/490.1 |
| 6,722,682 B2 * | 4/2004 | Valliere | ................. | B60D 1/143 280/405.1 |
| 7,255,362 B2 * | 8/2007 | Smith | ...................... | B60D 1/46 280/462 |
| 2011/0037242 A1 * | 2/2011 | Hensley | ................. | B60D 1/065 280/477 |

* cited by examiner

*Primary Examiner* — Jacob Knutson
(74) *Attorney, Agent, or Firm* — Shewchuk IP Services, LLC; Jeffrey D. Shewechuk

(57) ABSTRACT

A ball mount head has a pivotable connection to a shank portion of a weight distribution hitch. A tilt selector receives a bolt through a hole and is connected to one of the shank portion and the ball mount head with two pegs extending into two of at least three connection points on the ball mount head. An operator selects which two out of the connection points to use, which determines and sets the location of the tilt selector bolt hole relative to the ball mount head, which in turn determines and sets the angular position of the ball mount head relative to the shank portion when the bolt is tightened.

19 Claims, 3 Drawing Sheets

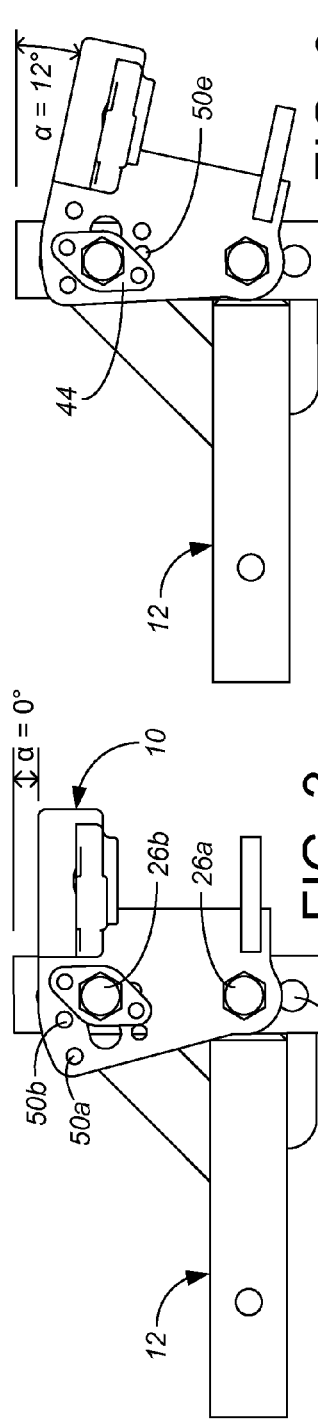
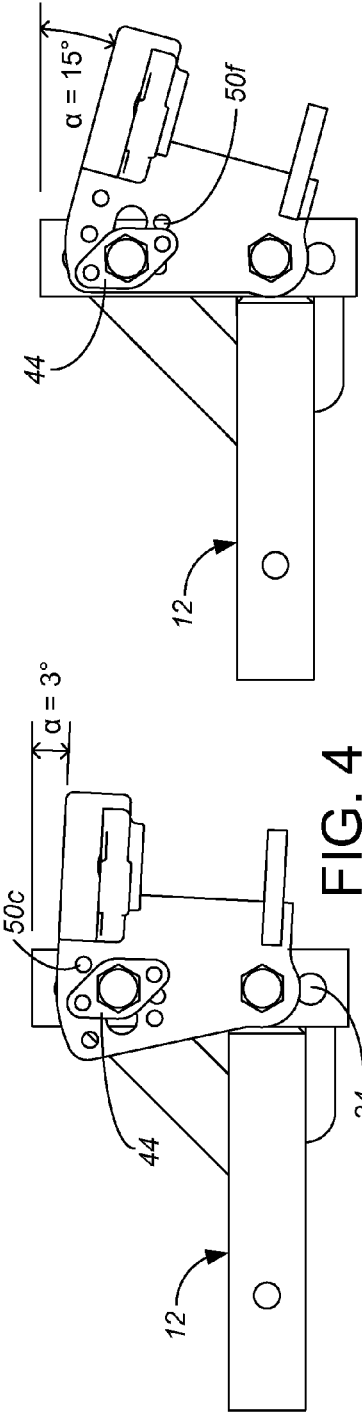
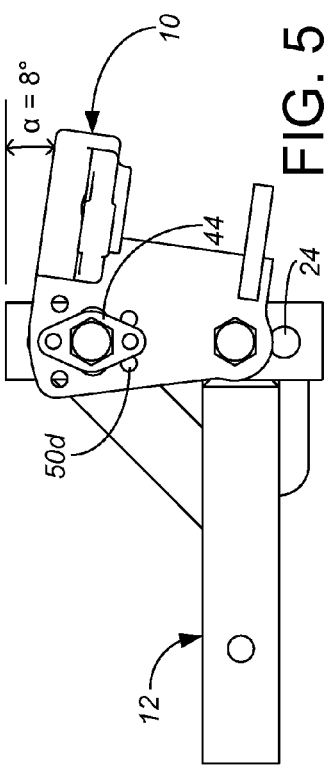

TILT ADJUSTMENT OF BALL MOUNT HEAD

CROSS-REFERENCE TO RELATED APPLICATION(S)

The present application claims the benefit of U.S. provisional patent application Ser. No. 61/889,407 filed Oct. 10, 2013. The contents of U.S. provisional patent application Ser. No. 61/889,407 are hereby incorporated by reference in entirety.

BACKGROUND OF THE INVENTION

The present invention relates to weight distributing hitches, and particularly to the angular connection used between two portions of weight distributing hitches to influence the spring force transmitted by the spring bars.

Numerous prior art configurations of weight distributing hitches exist, such as those disclosed in U.S. Pat. Nos. 4,033,601, 4,211,427, 5,465,991, 5,562,298, 5,799,965 and 6,722,682, each incorporated by reference. Each of these designs involves a mounting rack (also called a shank) with a series of vertically spaced holes which are used to bolt a ball mount head thereto, typically using two mounting bolts. At least one of the two mounting bolts is received in an arcuate slot in the ball mount head, enabling adjustment of the vertical tilt angle of the ball mount head relative to the mounting rack.

While these various prior art configurations provide certain advantages, they also have shortcomings. For many of the prior art configurations, the angular position of the ball mount head relative to the mounting rack is not easily characterized/described and is not readily repeatable. Operators know that the prior art structures permit changing of the angular relationship, but do not know (without detailed separate measurements) which angular position has been chosen. Additionally, many or all of the prior art configurations are difficult for an operator to assemble and disassemble, requiring the operator to simultaneous hold both the ball mount head and the tilt adjustment structure in position while inserting the bolt/fastener. With only two hands, such assembly and disassembly of prior art configurations can be time consuming and frustrating. Better solutions are needed.

BRIEF SUMMARY OF THE INVENTION

The present invention involves a ball mount head which has a pivotable connection to a shank portion of a weight distribution hitch enabling the ball mount head and the shank portion to be angularly adjustable with respect to one another. A tilt selector receives a fastener through a hole and is connected to one of the shank portion and the ball mount head at two out of at least three connection points. By selecting which two out of the at least three connection points to use, the operator can select and change the position of the hole relative to one of the shank portion and the ball mount head, which in turn allows the angular position of the ball mount head relative to the shank portion to be selected and changed. The fastener is then tightenable to hold the ball mount head and the shank at the selected angular position.

BRIEF DESCRIPTION OF THE DRAWINGS

The present invention is described with reference to the attached drawings, which show a single preferred embodiment:

FIG. 3 shows a side view of the weight distributing hitch of FIGS. 1 and 2 in a 0° tilt angle achieved by the preferred embodiment at a selected height.

FIG. 4 shows a side view of the weight distributing hitch of FIGS. 1 and 2 in a 3° tilt angle achieved by the preferred embodiment at the selected height.

FIG. 5 shows a side view of the weight distributing hitch of FIGS. 1 and 2 in a 8° tilt angle achieved by the preferred embodiment at the selected height.

FIG. 6 shows a side view of the weight distributing hitch of FIGS. 1 and 2 in a 12° tilt angle achieved by the preferred embodiment at the selected height.

FIG. 7 shows a side view of the weight distributing hitch of FIGS. 1 and 2 in a 15° tilt angle achieved by the preferred embodiment at the selected height.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
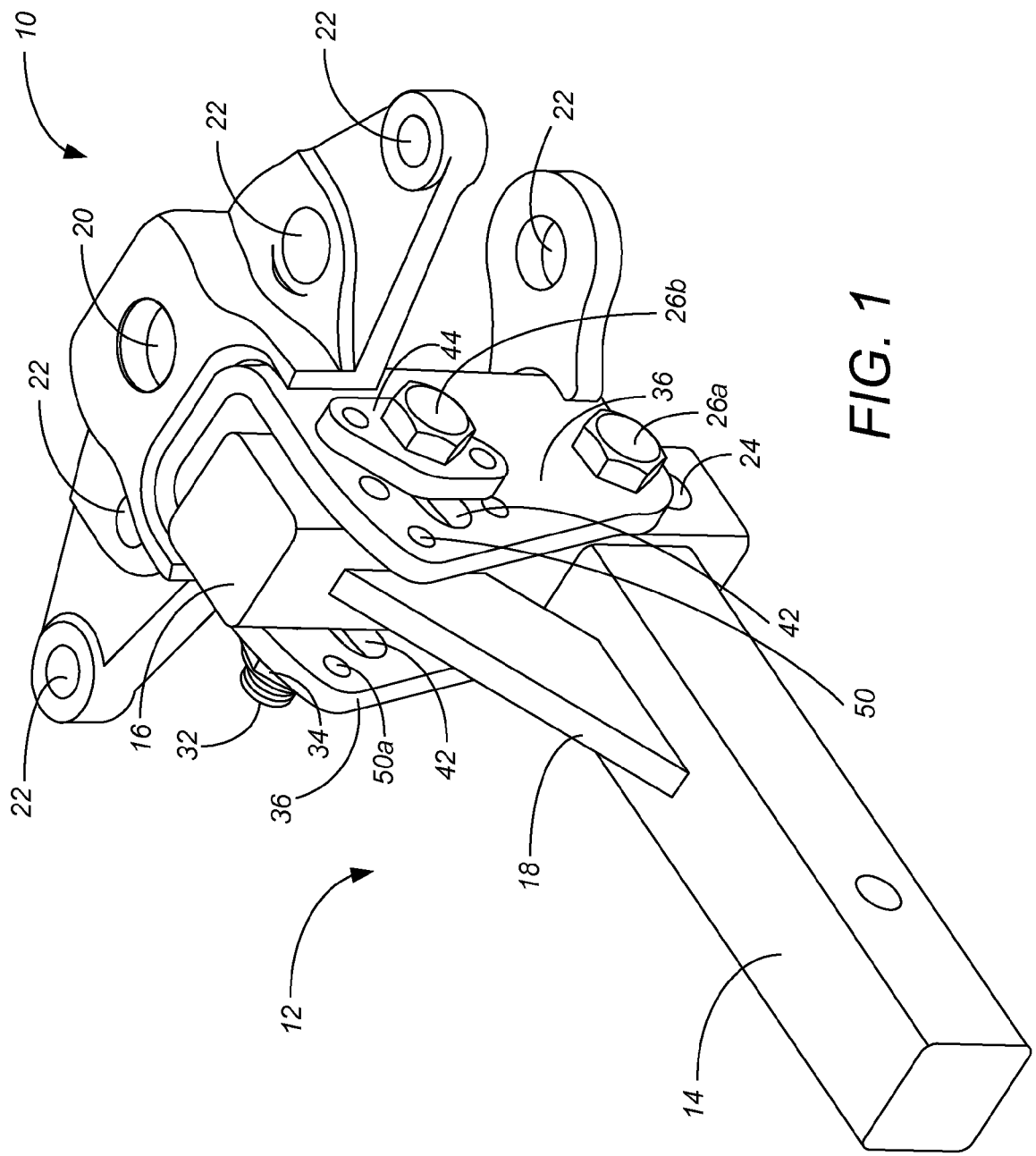
FIG. 1 shows a perspective view of a portion of a weight distributing hitch in accordance with a preferred embodiment of the present invention.
Figure 2:
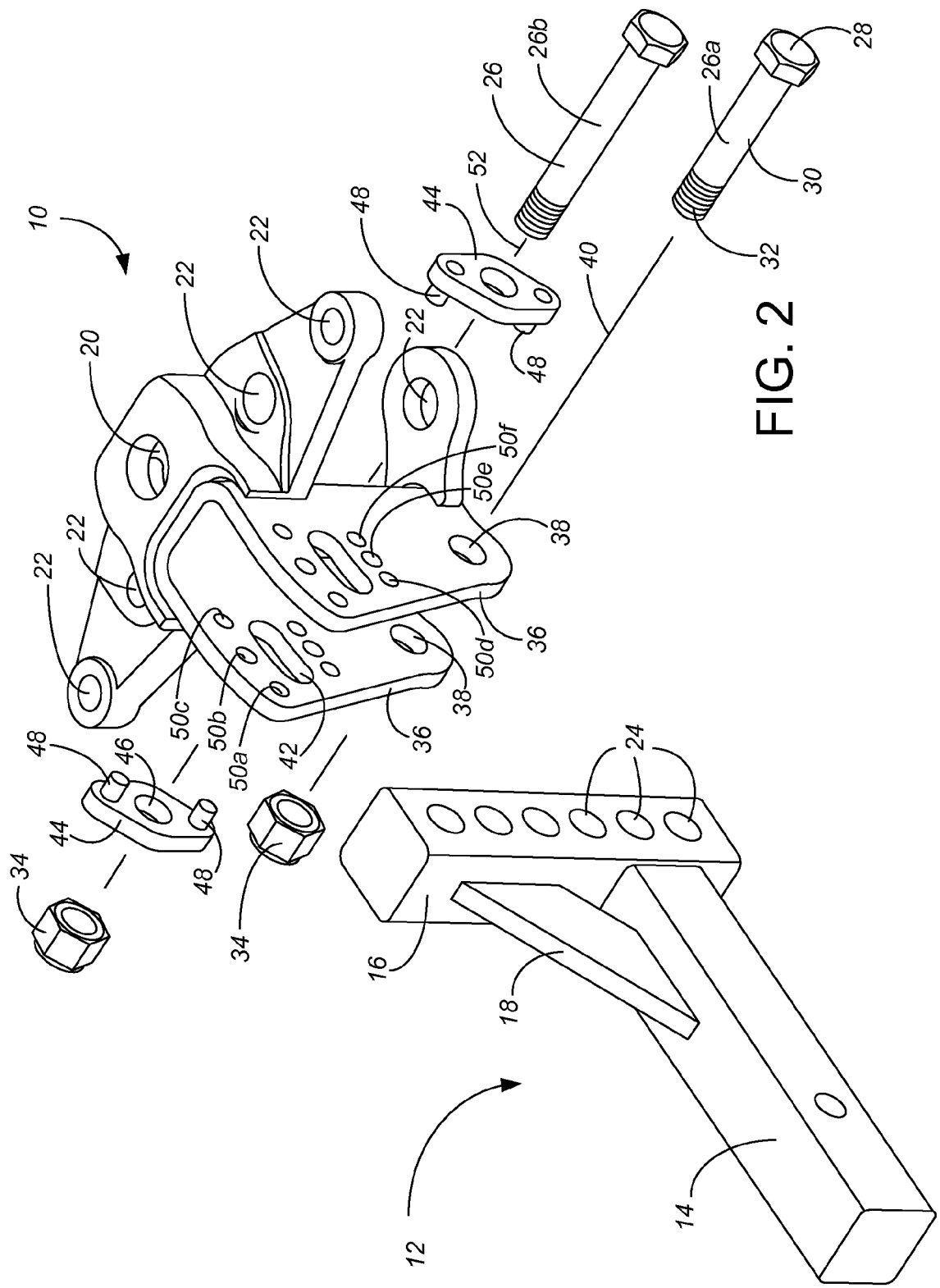
FIG. 2 shows an exploded perspective view of the weight distributing hitch portion of FIG. 1.

As shown in FIGS. 1 and 2, a preferred embodiment of the present invention involves a ball mount head 10 which is bolted to a mounting rack 12, also referred to as a shank. As known in the art and disclosed in more detail in the incorporation by reference documents, the mounting rack 12 includes a horizontal portion 14 which is received in a generally square, mating receiver tube (not shown) of a hitch. In the preferred embodiment, a mounting post 16 extends vertically from a distal end of the horizontal portion 14, and a strengthening rib 18 extends between the mounting post 16 and the horizontal portion 14 to maintain a right angle between the horizontal portion 14 of the mounting post 16 during towing conditions and over years of use. As known in the art and disclosed in more detail in the incorporation by reference documents, the ball mount head 10 has a central hitch ball post hole 20, and two sets of side spring bar mounting holes 22. Additional structures such as a hitch ball (not shown) and spring bars (not shown) are attached to the ball mount head 10 enabling the functionality of the weight distributing hitch.

The preferred mounting rack 12 includes a number of vertically spaced mounting holes 24, and the ball mount head 10 is attached to the mounting rack 12 with two bolts 26. The two bolts 26 are preferably standard bolts, each with a bolt head 28, a cylindrical bolt body 30 and a threaded end 32. A nut 34 can be screwed onto the threaded end 32 of each bolt 26. With six holes 24 for the two bolts 26 and the preferred spacing between the bolts 26 and the mounting holes 24, the preferred configuration provides three vertical positions of the ball mount head 10 relative to the mounting rack 12 and receiver tube of the towing vehicle (not shown). By inverting the mounting rack 12 relative to the receiver tube (i.e., flipping the mounting rack 12 to an upside down configuration), an additional three vertical positions of the ball mount head 10 relative to the receiver tube can be achieved. The term "mounting rack" as used herein refers to a structure received in a receiver tube of a hitch which permits a plurality of different potential vertical positions of the ball mount head relative to the mounting rack, whereas the term "shank" as used herein may have either a single or multiple potential vertical positions of the ball mount head relative to the receiver tube.

In the preferred configuration, the mounting holes 24 are sized to match with the bolt body diameter with a clearance, so each bolt 26 can rotate within its mounting hole 24, and can be hand inserted and removed so long as the nut 34 is unattached. For instance, the mounting holes 24 may be about 0.8 inches in diameter and vertically spaced apart by center distances of about 1¼ inches. The clearance for one or both mounting bolts 26 permits slight vertical translation of the mounting bolt(s) 26 within the mounting holes 24. If desired, the lower mounting bolt 26a may not permit any vertical translation of the mounting bolt 26 within the mounting holes 24. More preferably, both the upper mounting bolt 26b and the lower mounting bolt 26a are the same diameter and slightly smaller than the bolt holes 24 in the mounting rack 12, permitting a slight vertical translation of each mounting bolt 26a, 26b within the mounting holes 24. For instance, the bolt bodies 30 may be about 0.75 inches in diameter to mate into the 0.8 inch mounting holes 24. This allows the distance separating the axes 40, 52 of the two mounting bolts 26a, 26b to range over a distance of about 3.7 to 3.8 inches while extending within mounting holes 24. Upper mounting bolt 26b is preferably somewhat longer than lower mounting bolt 26a. More and/or other arrangements to adjust the height of the ball mount head 10 relative to the receiver tube can alternatively be used. As one example, other types of fasteners could be used instead of one or both mounting bolts 26, so long as the fastener used is tightenable to secure the angular position of the ball mount head relative to the shank, and loosenable to allow changing of the angular position of the ball mount head relative to the shank.

In the preferred embodiment, the ball mount head 10 includes two vertically extending mounting flanges 36 with a gap which matches the width of the mounting rack 12, such as about a 2 inch gap. The mounting flanges 36 preferably include mirror image mounting openings 38, 42, 50. A bottom set of bolt holes 38 is sized to receive the bolt body diameter of the lower mounting bolt 26a with minimal clearance so the bolt 26 can rotate (but preferably cannot translate) within its set of bolt holes 38, and can be hand inserted and removed so long as the nut 34 is unattached. The bottom set of bolt holes 38 and axis 40 of the lower mounting bolt 26a generally define a pivot point for tilting of the ball mount head 10 relative to the mounting rack 12, enabling the ball mount head 10 to be angularly adjustable relative to the mounting rack 12. Alternatively, the ball mount head 10 could be attached on a single side of the mounting rack 12, or could be attached as a single flangeless structure (not shown) within two flanges (not shown) of the mounting rack 12. As another alternative for use with a shank without a vertical adjustment capability, a permanently attached pivot pin could be used instead of the lower mounting bolt 26.

A top set of openings 42 in the ball mount head 10 receives the upper mounting bolt 26. In the preferred embodiment, each opening 42 is considerably larger than the body diameter of the upper mounting bolt 26b, so as to enable a range of tilting possibilities of the ball mount head 10 relative to the mounting rack 12. In the preferred embodiment, the opening 42 is an arcuate slot, with a height which is about 0.2 inches larger than the body diameter of the upper mounting bolt 26b, and with a length which extends in a circular arc centered on the pivot point 26a. In the preferred embodiment, the length of the arcuate slot 42 extends over a 15° arc centered on the pivot point 26a, such that the opening 42 permits tilt angles a of the ball mount head 10 relative to the mounting rack 12 over a range of 0 to 15°. The five preferred tilt angles α of 0, 3, 8, 12 and 15° are shown in FIGS. 3-7.

Two tilt selectors 44, one on each opposing side of the ball mount head 10 (i.e., one for each mounting flange 36) and shank 12, are used to determine the tilt angle α of the ball mount head 10 relative to the mounting rack 12. It would alternatively be possible to design a system using a single tilt selector 44.

Each tilt selector 44 has a central hole 46 sized to receive the top mounting bolt 26b, spaced between upper and lower extensions 48 which in the preferred embodiment are cylindrical tilt pegs. Alternatively, the mounting bolt 26 could be received in one of the tilt selectors 44 (possibly in the only tilt selector 44) as a welded stud. In the preferred embodiment, the upper and lower tilt pegs 48 are spaced with their axes 2 inches apart, with the central hole 46 spaced directly halfway between the upper and lower tilt pegs 48. The central hole 46 in the tilt selector 44 is cylindrical and sized to receive the body diameter of the upper mounting bolt 26b, such that the mounting bolt axis 52 is coincident with the axis of the central hole 46. With the central hole 46 receiving the upper mounting bolt 26b, the tilt selector 44 is rotatable about the upper mounting bolt axis 52 to define a plurality of tightenable positions of the upper mounting bolt 26 relative to the opening 42.

The upper and lower tilt pegs 48 are received in recesses 50 which in the preferred embodiment are cylindrical tilt holes, with at least three tilt holes 50 being provided as connection positions for the two tilt pegs 48, and with equal spacing between at least two sets of holes 50. More preferably, the ball mount head 10 includes at least two inside connection holes 50 closer to the pivot axis 40 than the opening 42 and at least two outside connection positions 50 further from the pivot axis 40 than the opening 42. The most preferred embodiment has three fore-aft spaced tilt holes 50a, 50b, 50c above each arcuate slot 42, at a distance further from the pivot point 40 than the arcuate slot 42, and three fore-aft spaced tilt holes 50d, 50e, 50f below each arcuate slot 42 at a distance nearer to the pivot point 40 than the arcuate slot 42. In the preferred configuration, the three lower tilt holes 50d, 50e, 50f are arranged to each be the same distance (two inches, in the preferred embodiment) from the middle upper tilt hole 50b, and the three upper tilt holes 50a, 50b, 50c are arranged to each be the same distance (two inches, in the preferred embodiment) from the middle lower tilt hole 50e.

As shown in FIGS. 3-7, the tilt pegs 48 of the tilt selector 44 can be positioned into the six tilt holes 50a-f at any of five different positions, with each different position defining a different fore-aft location of the central hole 46 in the arcuate slot 42. Thus, the selection of which two connection positions 50 are used by the tilt selector 44 determines the rotatable position of the tilt selector 44 relative to the upper mounting bolt 26 and thereby determines the angular position of the ball mount head 10 relative to the shank 12. In each case, the position of the central hole 46 of the tilt selector 44 relative to the arcuate slot 42 defines the tilt angle α of the ball mount head 10 relative to the mounting rack 12, with the preferred defined tilts a being about 0°, 3°, 8°, 12° and 15°. In the preferred embodiment as shown in FIG. 3, the 0° tilt is achieved by placing the pegs 48 of the tilt selector 44 into the rear top tilt hole 50a and the central bottom tilt hole 50e. As shown in FIG. 4, the 3° tilt is achieved by placing the pegs 48 of the tilt selector 44 into the central top tilt hole 50b and the rear bottom tilt hole 50d. As shown in FIG. 5, the 8° tilt is achieved by placing the pegs 48 of the tilt selector 44 into the central top tilt hole 50b and the central bottom tilt hole 50e. As shown in FIG. 6, the 12° tilt is achieved by placing the pegs 48 of the tilt selector 44 into the central top tilt hole 50b and the front bottom tilt hole 50f. As shown in FIG. 7, the 15° tilt is achieved by placing the pegs 48 of the tilt selector 44 into the front top tilt hole 50c and the central bottom tilt hole 50e. Workers skilled in the art will appreciate that other defined tilts can be designed merely by changing the locations of the tilt holes 50 in the ball mount head 10, and that more defined tilts a can be provided by increasing the number of different tilt holes 50 in the ball mount head 10. One alternative preferred set of tilt angles includes tilts α of 0°, 4°, 6°, and 10°.

Given the above description of a preferred structure, use of the weight distributing hitch of the present invention is intuitive and straight forward. In the usual method, the operator will first establish a pivoting connection between the ball mount head 10 and the mounting rack 12 at a selected elevation by aligning the lower mounting bolt holes 38 of the ball mount head 10 with one of the three lower vertically spaced holes 24 and inserting the lower mounting bolt 26a therethrough. If desired, the nut 34 for the lower mounting bolt 26a can be loosely attached on the threads 32. The operator then selects the desired angular position for the ball mount head 10 relative to the mounting rack 12 by inserting the tilt pins 48 for each of the tilt selectors 44 into a selected two holes 50a-f on each side of the ball mount head 10. The tilt pins 48 support the tilt selectors 44 as the operator aligns the central hole 46 of the tilt selector 44 with whichever of the three upper vertically spaced holes 24 is at the proper elevation, inserting the upper mounting bolt 26b through both tilt selectors 44 as well as through the opening of the ball mount head 10 and through the mounting rack 12. Both nuts 34 are then merely tightened to secure the ball mount head 10 to the mounting rack 12 at the selected elevation and selected angular position. Once the upper nut 34 is tightened, the upper mounting bolt 26 prevents the pegs 48 of the tilt selectors 44 from coming out of the selected tilt holes 50.

The present invention improves upon all of the known prior art structures primarily by providing defined amounts of angular tilt α which can be readily identified and reproduced. For instance, instructions to "change from a 12° tilt to a 3° tilt" can be easily given, understood and followed. Since the amount of tilt α affects the force transferred by the weight distributing spring bars (not shown), better, more consistent and more repeatable weight distributing loads can be achieved.

The present invention also improves upon the prior art structures because the pegs 48 of the tilt selectors 44 can support the weight/location of the tilt selector 44 on the ball mount head 10 prior to insertion of the mounting bolts 26. This allows the operator to more easily assemble the hitch to the desired tilt angle and to more easily align the holes in the ball mount head 10 to the holes in the mounting rack 12 for insertion of the mounting bolts 26.

The tilt selectors 44 and tilt holes 50 of the present invention can also be used in other hitch configurations (not necessarily weight distributing) where a selectable, repeatable tilt angle α is desired.

Although the present invention has been described with reference to preferred embodiments, workers skilled in the art will recognize that changes may be made in form and detail without departing from the spirit and scope of the invention. For instance, while the tilt selector 44 is depicted and described as mating into the ball mount head 10 about the opening 42 in the ball mount head 10, a reversal of parts could be used instead with the tilt selector mating into the shank, and with the larger arcuate opening instead formed in the shank. Vertical adjustability could alternatively be achieved with six vertically spaced bolt holes on the ball mount head instead of in the shank (mounting rack).

What is claimed is:

1. A weight distribution hitch comprising:
   a shank portion;
   a ball mount head angularly adjustably connected to the shank portion about a pivot axis;
   an opening in one of the shank portion and the ball mount head;
   a fastener extending through the opening and smaller than the opening to allow movement of the fastener within the opening, the fastener being tightenable to secure an angular position of the ball mount head relative to the shank, the fastener being loosenable to allow changing of the angular position of the ball mount head relative to the shank, the fastener defining a fastener axis;
   a tilt selector receiving the fastener, the tilt selector being rotatable about the fastener axis to define a plurality of tightenable positions of the fastener relative to the opening and thereby define the angular position of the ball mount head relative to the shank, the tilt selector mating about the opening with at least three connection positions including at least one inside connection position closer to the pivot axis than the opening and at least one outside connection position further from the pivot axis than the opening, such that the selection of two connection positions simultaneously used by the tilt selector of the at least three connection positions determines the rotatable position of the tilt selector relative to the fastener and thereby determines the angular position of the ball mount head relative to the shank.

2. The weight distribution hitch of claim 1, wherein the opening is an arcuate opening arcing around the pivot axis.

3. The weight distribution hitch of claim 1, wherein the connection positions are each recesses, and wherein the tilt selector comprises two extensions extending into a selected two of the at least three recesses.

4. The weight distribution hitch of claim 3, wherein the recesses are at least three holes in the ball mount head, and wherein the extensions are two pins in the tilt selector each sized to mate with the holes, such that the selection of which two holes of the at least three holes will be used to receive the two pins determines the rotatable position of the tilt selector relative to the fastener and thereby determines the angular position of the ball mount head relative to the shank.

5. The weight distribution hitch of claim 4, wherein the at least one inside connection position comprises three inside connection positions closer to the pivot axis than the opening and wherein the at least one outside connection position comprises three outside connection positions further from the pivot axis than the opening.

6. The weight distribution hitch of claim 5, wherein the tilt selector defines at least five tightenable positions of the plurality of tightenable positions of the fastener relative to the opening.

7. The weight distribution hitch of claim 6, wherein the five tightenable positions comprise relative angles of about 0, 3, 8, 12 and 15 degrees between the ball mount head and the shank.

8. The weight distribution hitch of claim 3, wherein the three connection positions comprises at least six recesses and the tilt selector defines at least five tightenable predefined positions of the plurality of tightenable positions of the fastener relative to the opening, and wherein the tilt selector can be rotated about the fastener to one of the five tightenable predefined positions.

9. The weight distribution hitch of claim 1, wherein the fastener is a bolt separate from the tilt selector.

10. The weight distribution hitch of claim 9, wherein the bolt has a bolt head, a body having a body diameter and a threaded end, wherein the tilt selector comprises a cylindrical tilt selector bolt hole sized to receive the body diameter of the bolt in a position of the bolt relative to the tilt selector with the fastener axis being coincident with an axis of the cylindrical tilt selector bolt hole.

11. The weight distribution hitch of claim 10, wherein the ball mount head comprises a cylindrical bolt hole sized to receive the body diameter of the bolt in a position of the bolt relative to the ball mount head with the fastener axis being coincident with an axis of the cylindrical bolt hole.

12. The weight distribution hitch of claim 1, wherein the opening in one of the shank portion and the ball mount head is a first hole in the shank portion, and wherein the shank portion comprises at least a second hole spaced form the first hole, with the first hole being used for the pivot axis and the second hold being used for the fastener.

13. The weight distribution hitch of claim 1, wherein the shank portion is a mounting rack, wherein the opening in one of the shank portion and the ball mount head is a first hole in the mounting rack, and wherein the mounting rack comprises second and third holes to total at least three vertically spaced holes, with one of the holes being used for the pivot axis and another one of the holes being used for the fastener, wherein a vertical position of the ball mount head relative to the mounting rack is determined based upon which two holes of the at least three vertically spaced holes are used.

14. The weight distribution hitch of claim 1, comprising a second tilt selector on an opposing side of the ball mount head and the shank portion.

15. The weight distribution hitch of claim 1, wherein the fastener is inserted through a central hole of the tilt selector while the tilt selector is supported on the ball mount head.

16. A method of assembling a weight distribution hitch comprising:
providing a shank portion;
connecting a ball mount head to the shank portion about a pivot axis, one of the ball mount head and the shank portion defining an opening;
selecting an angular position of the ball mount head relative to the shank based upon a rotatable position of a tilt selector relative to a fastener, the fastener extending through the opening and being smaller than the opening to allow movement of the fastener within the opening, the fastener being tightenable to secure an angular position of the ball mount head relative to the shank, the fastener being loosenable to allow changing of the angular position of the ball mount head relative to the shank, the fastener defining a fastener axis, the tilt selector receiving the fastener, the tilt selector being rotatable about the fastener axis to define a plurality of tightenable positions of the fastener relative to the opening and thereby define the angular positions of the ball mount head relative to the shank, the tilt selector mating about the opening with at least three connection positions including at least one inside connection position closer to the pivot axis than the opening and at least one outside connection position further from the pivot axis than the opening, such that the selection of two connection positions simultaneously used by the tilt selector of the at least three connection positions determines the rotatable position of the tilt selector relative to the fastener and thereby determines the angular position of the ball mount head relative to the shank; and
tightening the fastener in the selected rotatable position of the tilt selector and the selected angular position of the ball mount head relative to the shank.

17. The method of claim 16, wherein the connection positions are each recesses, and wherein the act of selecting an angular position of the ball mount head relative to the shank comprises placing two extensions of the tilt selector into a selected two of the at least three recesses.

18. A hitch comprising:
a shank portion;
a head angularly adjustably connected to the shank portion about a pivot axis;
an opening in one of the shank portion and the ball mount head;
at least three holes about the opening, at least one of the holes being further from the pivot axis than the opening and at least another one of the holes being closer to the pivot axis than the opening;
a bolt extending through the opening and smaller than the opening to allow movement of the bolt within the opening, the bolt being tightenable to secure an angular position of the ball mount head relative to the shank, the bolt being loosenable to allow changing of the angular position of the ball mount head relative to the shank, the fastener defining a fastener axis;
a tilt selector having a central hole receiving the bolt, the tilt selector being rotatable about the bolt;
at least two connection pegs on the tilt selector which mate into the at least three holes in a plurality of different positions, with each position of the tilt selector holding the bolt in a different location within the opening, such that the holes selected to receive the connection pegs determines the selected angular position of the head relative to the shank.

19. The hitch of claim 18, wherein the at least three holes about the opening wherein the at least three holes comprises an additional three holes for a total of at least six holes, wherein the tilt selector can hold the bolt in any of at least five selectable tightenable positions of the bolt relative to the opening.

\* \* \* \* \*